(12) United States Patent
Harinath et al.

(10) Patent No.: US 8,114,364 B2
(45) Date of Patent: Feb. 14, 2012

(54) INCREASED REDUCTANT DECOMPOSITION REACTOR ROBUSTNESS THROUGH THE USE OF A HYDROLYTIC CATALYST COATING

(75) Inventors: Arvind V. Harinath, Columbus, IN (US); Bryan E. Blackwell, Franklin, IN (US); Thomas M. Yonushonis, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 409 days.

(21) Appl. No.: 12/364,048

(22) Filed: Feb. 2, 2009

(65) Prior Publication Data

US 2010/0196225 A1    Aug. 5, 2010

(51) Int. Cl.
B01J 10/00    (2006.01)
F01N 3/00    (2006.01)

(52) U.S. Cl. ............ 422/654; 422/187; 422/224; 60/286
(58) Field of Classification Search .................. 422/187, 422/224, 654; 60/286
See application file for complete search history.

(56) References Cited

U.S. PATENT DOCUMENTS

| | | | |
|---|---|---|---|
| 4,051,671 A * | 10/1977 | Brewer | .................... 60/262 |
| 5,976,475 A | 11/1999 | Peter-Hoblyn et al. | |
| 6,449,947 B1 | 9/2002 | Liu et al. | |
| 6,601,385 B2 | 8/2003 | Verdegan et al. | |
| 6,722,123 B2 | 4/2004 | Liu et al. | |
| 6,761,025 B1 | 7/2004 | Gladden | |
| 6,959,538 B2 | 11/2005 | Cho et al. | |
| 7,328,572 B2 | 2/2008 | McKinley et al. | |
| 7,380,395 B2 | 6/2008 | Brück et al. | |
| 2004/0098971 A1 | 5/2004 | Upadhyay et al. | |
| 2006/0233689 A1 | 10/2006 | Hirata et al. | |
| 2007/0101703 A1 | 5/2007 | Kanaya et al. | |
| 2007/0163241 A1 | 7/2007 | Meingast et al. | |

FOREIGN PATENT DOCUMENTS

| | | |
|---|---|---|
| JP | 5-163933 | 6/1993 |
| JP | 2006-167576 | 6/2006 |
| JP | 2006-233846 | 9/2006 |

OTHER PUBLICATIONS

U.S. Appl. No. 12/145,618, filed Jun. 25, 2008.
U.S. Appl. No. 12/237,574, filed Sep. 25, 2008.
U.S. Appl. No. 12/252,689, filed Oct. 16, 2008.
International Search Report for international application No. PCT/US2010/022092, dated Aug. 25, 2010 (3 pages).
Written Opinion for international application No. PCT/US2010/022092, dated Aug. 25, 2010 (4 pages).

* cited by examiner

*Primary Examiner* — Walter D Griffin
*Assistant Examiner* — Timothy Cleveland
(74) *Attorney, Agent, or Firm* — Hamre, Schumann, Mueller & Larson, P.C.

(57) ABSTRACT

A means for increasing the robustness of a SCR after-treatment system is provided. Specifically, a hydrolysis catalyst coating is applied to multiple surfaces within a decomposition reactor to aid in urea and urea based deposit decomposition and mitigation of urea based deposits. The reactor includes an injector mount attached to a middle tube portion, an inlet tube, an outlet tube and a mixer. A hydrolysis catalyst coating is applied to an inner surface of the injector mount, an inner surface of the middle tube portion, an inner surface of the outlet tube and an outer edge of the mixer. The hydrolysis catalyst coating is capable of decomposing urea and urea based deposits that comes in contact with the hydrolysis catalyst coating and mitigates the formation of urea based deposits.

16 Claims, 3 Drawing Sheets

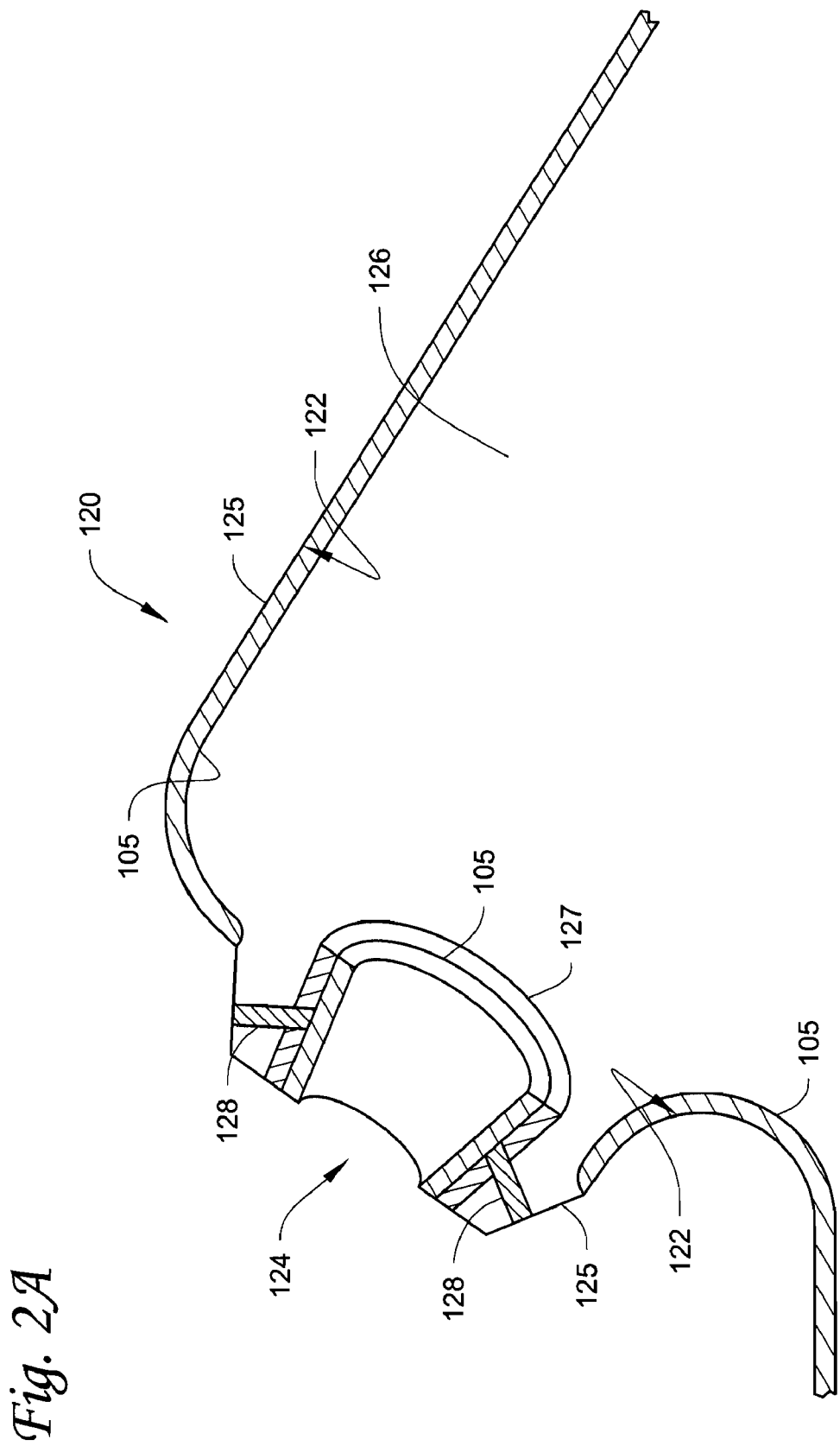

INCREASED REDUCTANT DECOMPOSITION REACTOR ROBUSTNESS THROUGH THE USE OF A HYDROLYTIC CATALYST COATING

FIELD

This disclosure relates to the field of exhaust systems. More particularly, this description relates to the selective catalytic reduction (SCR) after-treatment portion of an exhaust system that uses a hydrolytic catalyst coating to increase the performance and durability of the overall exhaust system.

BACKGROUND

A common problem associated with the use of internal combustion engines is the formation of undesirable byproducts found in the exhaust stream, particularly nitrogen-oxides. After-treatment systems, such as selective catalytic reaction (SCR) systems, are used to lower the nitrogen-oxide content in the exhaust stream using urea dosing systems to break down the nitrogen oxides. However, urea dosing systems are prone to the formation of urea deposits in the after-treatment system. Buildup of urea deposits can result in the corrosion and erosion of portions of the urea decomposition reactor that come in contact with the urea. Ultimately, these urea deposits can result in emissions compliance failure in the after-treatment system and the increase of engine backpressure. In the past, hydrolysis catalyst coatings have been applied to portions of a permeable catalytic device in the after-treatment system to improve the performance of an SCR system, but their utility has not yet been applied to prevent the formation and buildup of urea deposits throughout a reductant decomposition reactor.

SUMMARY

This application describes a hydrolysis catalyst coating employed in various regions within the after-treatment portion of an exhaust system. The hydrolysis catalyst coating increases the rate of urea and urea based deposit decomposition and mitigates the formation of urea based deposits in the reactor leading to a more efficient after-treatment system. Specifically, the hydrolysis catalyst coating decomposes the urea and the urea based deposits into ammonia in a short residence time, even in low temperature and/or low flow velocity portions of the after-treatment system. This allows for after-treatment capability in application regimes where urea dosing was previously impractical. The hydrolysis catalyst coating also prevents the erosion and corrosion of portions of the after-treatment system that come into contact with the urea or byproducts of the urea. The protective effect of this coating allows for increased component lifetime and the capability of using less expensive materials, such as cost effective stainless steel material, to manufacture the after-treatment system and still retain the same durability.

In particular, the hydrolysis catalyst coating improves ammonia generation kinetics by maximizing the surface temperature of the surfaces coated with the hydrolysis catalyst coating, thereby eliminating Isocyanic acid (HNCO) complexes and decreasing the formation of byproducts such as Biuret, Isocyanuric acid, Ammeline and Ammelide. HNCO complexes act as a precursor for the formation of urea deposits which can cause corrosion of the metallic portions of the exhaust system. Also, the hydrolysis catalyst coating lowers the dosing temperature of urea entering into the decomposition reactor, thereby improving the overall process of breaking down nitrogen oxides in the after-treatment system.

In one embodiment, a reductant decomposition reactor that uses a hydrolysis catalyst coating capable of decomposing urea and urea based deposits and mitigating the formation of urea based deposits is provided. The reactor includes an injector mount attached to a middle tube portion, an inlet tube, an outlet tube and a mixer. The injector mount is capable of introducing urea into the reactor. The inlet tube is formed at a first end of the middle tube portion and is configured to connect to a first portion of an exhaust system. The outlet tube is formed at a second end of the middle tube portion and is configured to connect to a second portion of the exhaust system. The mixer is fit at an end of the middle tube portion adjacent to the outlet tube and is configured to decompose the urea introduced into the reactor via the injector mount. A hydrolysis catalyst coating is applied to an inner surface of the injector mount, an inner surface of the middle tube portion, an inner surface of the outlet tube and an outer edge of the mixer that is capable of decomposing urea and urea based deposits that come in contact with the hydrolysis catalyst coating and mitigates the formation of urea based deposits.

DESCRIPTION OF THE DRAWINGS

FIG. 2A is a sectional side view of one embodiment of the injector mount with a hydrolysis catalyst coating.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized without departing from the spirit and scope of the claims. The following detailed description is, therefore, not to be taken in a limiting sense.

The embodiments presented herein are directed to a reductant decomposition mixer with a hydrolysis catalyst coating. The hydrolysis catalyst coating increases the rate of urea and urea based deposit decomposition and mitigates the formation of urea based deposits in the reactor leading to a more efficient after-treatment system. Specifically, the hydrolysis catalyst coating decomposes the urea into ammonia in a short residence time, even in low temperature and/or low flow velocity portions of the after-treatment system. This allows for after-treatment capability in application regimes where urea dosing was previously impractical. The hydrolysis catalyst coating also prevents the erosion and corrosion of portions of the after-treatment system that come into contact with the urea or byproducts of the urea. The protective effect of this coating allows for increased component lifetime and the capability of using less expensive materials, such as cost effective stainless steel material, to manufacture the after-treatment system and still retain the same durability.

In particular, the hydrolysis catalyst coating improves ammonia generation kinetics by maximizing the surface temperature of the surfaces coated with the hydrolysis catalyst coating, thereby eliminating Isocyanic acid (HNCO) complexes and decreasing the formation of byproducts such as Biuret, Isocyanuric acid, Ammeline and Ammelide. HNCO complexes act as a precursor for the formation of urea based deposits which can cause corrosion of the metallic portions of the exhaust system. Also, the hydrolysis catalyst coating lowers the dosing temperature of urea entering into the decomposition reactor, thereby improving the overall process of breaking down nitrogen oxides in the after-treatment system.

Figure 1:
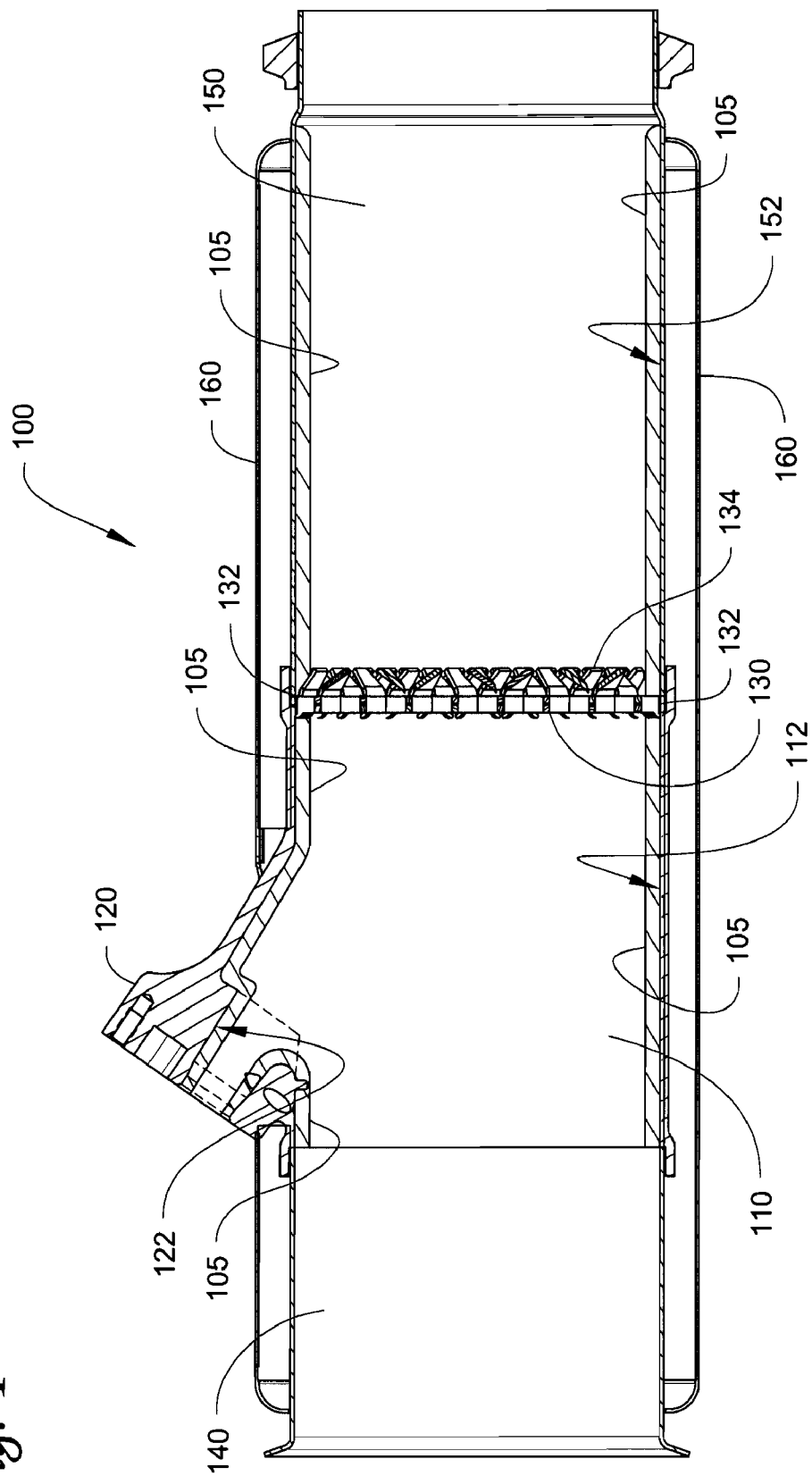
FIG. 1 is a side view of a detachable reductant decomposition reactor with a hydrolysis catalyst coating.

FIG. 1 is a side view of a detachable reductant decomposition reactor 100 with a hydrolysis catalyst coating 105. The reactor 100 can be similar to the reactor described in U.S. patent application Ser. No. 12/252,689, entitled "DETACHABLE DECOMPOSITION REACTOR WITH INTEGRAL MIXER", herewith incorporated by reference in its entirety.

The reactor 100 includes a middle tube portion 110, an injector mount 120, an inlet tube 140, an outlet tube 150 and a mixer 130. The injector mount 120 is capable of introducing urea into the reactor 100 and is attached to the middle tube portion 110. The mixer 130 is configured to decompose urea introduced into the reactor 100 via the injector mount 120 and is fit at an end of the middle tube portion 110 adjacent to the outlet tube portion 150. The mixer 130 in this embodiment is similar to the mixer described in U.S. patent application Ser. No. 12/237,574, entitled "REDUCTANT DECOMPOSITION MIXER AND METHOD FOR MAKING THE SAME", herewith incorporated by reference in its entirety. The inlet tube 140 is formed at a first end of the middle tube portion 110 and is configured to connect to a first portion of an SCR exhaust system (not shown). The outlet tube 150 is formed at a second end of the middle tube portion 110 and is configured to connect to a second portion of the SCR exhaust system (not shown). The inlet tube 140 and the outlet tube 150 are configured to meet any type of connection configuration to the SCR exhaust system.

The injector mount 120 and the mixer 130 are oriented to aim the urea sprayed into the reactor 100 via the injector mount 120 to a center of the mixer 130. The reactor 100 also includes an insulating layer 160 surrounding an outer surface of the middle tube portion 110, a portion of the inlet tube 140 and a portion of the outlet tube 150. The insulating layer 160 is provided to retain as much heat as possible within the reactor 100 to aid in decomposing nitrogen-oxide reductant in the exhaust stream.

The middle tube portion 110, the injector mount 120, the mixer 130 and the outlet tube 150 all come in contact with the urea and are typically made from the same material or materials with similar coefficients of thermal expansion. This allows the middle tube portion, the mixer 130 and the outlet tube 150 to have the same thermal expansion and contraction when the reactor 100 is used in an after-treatment system. The mixer 130 includes mixer blades 134 used for decomposing nitrogen-oxide reductant from the exhaust stream traveling through the decomposition reactor 100. The inlet tube 140 can be made from a lower cost material than that of the middle tube portion 110, the injector mount 120, the mixer 130 and the outlet tube 150, as the inlet tube 140 does not have direct contact with the urea.

As shown in FIG. 1, the hydrolysis catalyst coating 105 is applied to surfaces of the reactor 100 that come in contact with urea that is injected into the reactor 100 via the injector mount 120. In particular, the hydrolysis catalyst coating 105 is applied to an inner surface 122 of the injector mount 120, an inner surface 112 of the middle tube portion 110, an inner surface 152 of the outlet tube portion 150 and an outer edge 132 of the mixer 130. While the embodiment shown in FIG. 1 has the coating 105 applied to substantially the entire inner surface 122, the inner surface 112 the inner surface 152 and the outer edge 132, in other embodiments the coating 105 is applied only to a portion of these surfaces 122, 112 and 152 and the outer edge 132. Also, in some embodiments, the coating 105 is applied to less than all of the inner surfaces 122, 112 and 152 and the outer edge 132. The hydrolysis catalyst coating 105 can be applied to the above surfaces using a deep coating method, a plasma spraying method using a plasma spray, a spray painting method using a paint spray equipment, or any other conventional chemical techniques that would produce an even film of catalyst on the inner surface 122 of the injector mount 120, the inner surface 112 of the middle tube portion 110, the inner surface 152 of the outlet tube portion 150 or the outer edge 132 of the mixer 130.

The hydrolysis catalyst coating 105 is made up of a catalyst, a washcoat, binders and other additives. The washcoat is made up of metal oxides or zeolite or a combination of both metal oxides and zeolite. In one embodiment, the washcoat is made up of an anatase phase titania. However, in other embodiments the washcoat is made up of aluminum-oxide or cerium-oxide. An embodiment of the hydrolysis catalyst coating 105 is described in U.S. patent application Ser. No. 12/145,618, entitled "CATALYTIC DEVICES FOR CONVERTING UREA TO AMMONIA", herewith incorporated by reference in its entirety.

Figure 2B:
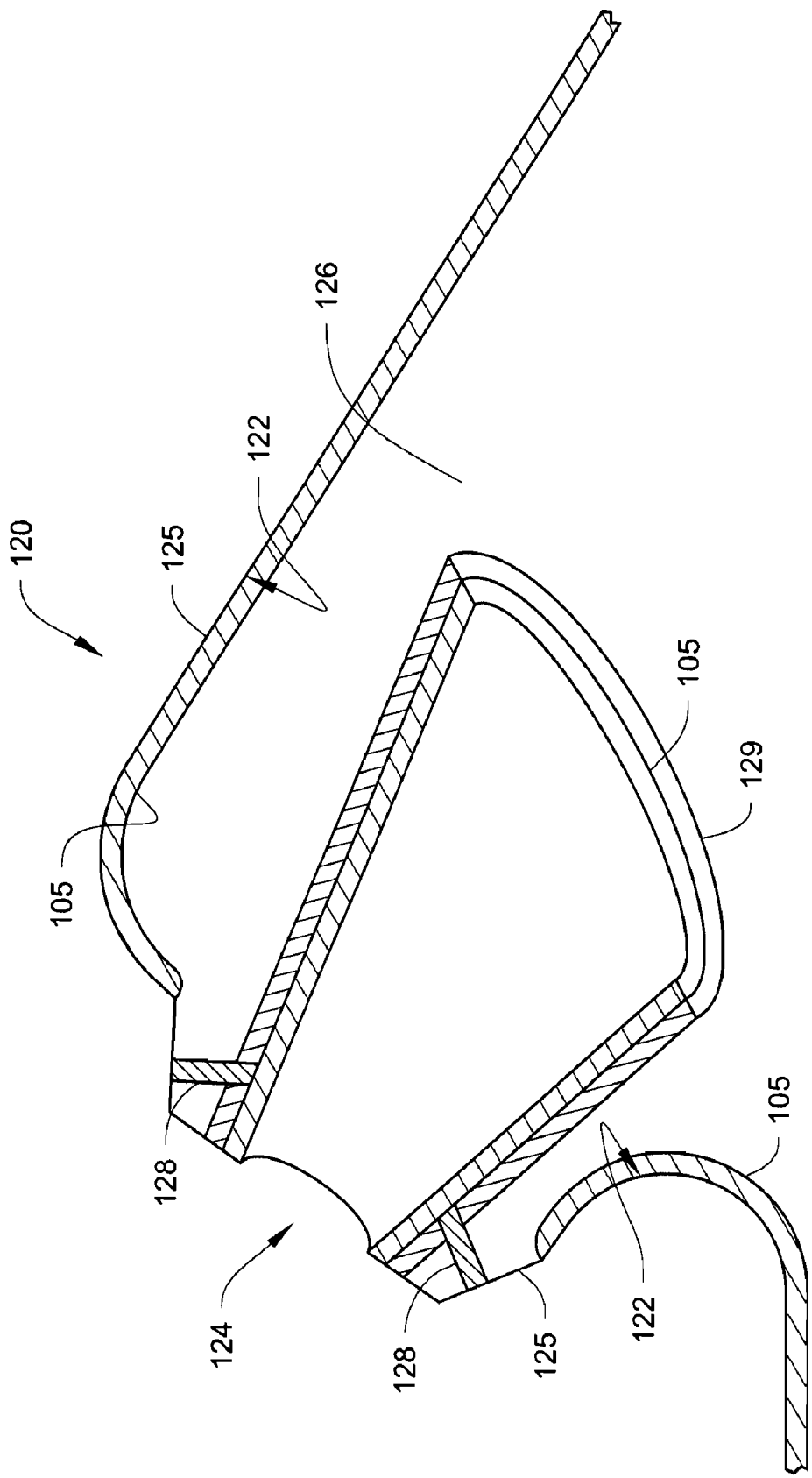
FIG. 2B is a sectional side view of one embodiment of the injector mount with a hydrolysis catalyst coating.

FIGS. 2A and 2B are sectional side views of two different embodiments of the injector mount 120. The hydrolysis catalyst coating 105 is applied to the inner surface 122 of the injector mount 120. The injector mount 120 includes an injector port 124, an injector housing 125 and an injector chamber 126 defined by the housing 125. The injector mount 120 is configured to inject urea via the injector port 124 into the middle tube portion 110 (shown in FIG. 1). The injector mount 120 is oriented to ensure that the urea travels through the reactor 100 and consequently through the after-treatment system.

As shown in FIG. 2A, the injector mount 120 also includes a skirt 127 attached to the inner surface 122 using metallic posts 128 near the injector port 124. The skirt 127 is composed of a metallic material and is provided to direct injected urea to pass through the skirt 127 and into the middle tube portion (not shown) in order to prevent the back splash of injected urea back into the injector port 124. Also, the hydrolysis catalyst coating 105 is applied to an inner surface of the skirt 127. In some embodiments, the coating 105 is applied only to a portion of the inner surface of the skirt 127. Also, in some embodiments, the coating 105 is applied to at least a portion of the outer surface of the skirt 127. The hydrolysis coating 105 is capable of mitigating the formation of urea deposits from forming at or near the injector port 124 and thereby maintaining a clear path for urea to enter the injector mount 120. The hydrolysis catalyst coating 105 on the inner surface 122 and on the skirt 127 is capable of rapidly heating exhaust gases that help prevent the formation of urea deposits while minimizing thermal conductive transfer to an attached urea injector (not shown).

As shown in FIG. 2B, the injector mount 120 includes an extended skirt 129 that extends into the injector chamber 126 substantially toward a top portion of the middle tube portion (shown in FIG. 1). The extended skirt 129 is attached to the inner surface 122 using metallic posts 128 near the injector port 124. The extended skirt 129 is composed of a metallic material and is provided to direct injected urea to pass through the extended skirt 129 and into the middle tube portion (shown in FIG. 1) in order to prevent the back splash of injected urea back into the injector port 124 and the injector chamber 126. Also, the hydrolysis catalyst coating 105 is applied to an inner surface of the skirt 129. In some embodiments, the coating 105 is applied only to a portion of the inner surface of the skirt 129. Also, in some embodiments, the coating 105 is applied to at least a portion of the outer surface of the skirt 129. The hydrolysis coating 105 is capable of mitigating the formation of urea based deposits from forming at or near the injector port 124 and thereby maintaining a clear path for urea to enter the injector mount 120. The hydrolysis catalyst coating 105 on the inner surface 122 and on the skirt 129 is capable of rapidly heating exhaust gases that help prevent the formation of urea based deposits while minimizing thermal conductive transfer to an attached urea injector (not shown).

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A reductant decomposition reactor capable of decomposing urea and urea based deposits and mitigating the formation of urea based deposits comprising:
    an injector mount attached to a middle tube portion, the injector mount capable of introducing urea into the reactor;
    an inlet tube disposed at a first end of the middle tube portion that is configured to connect to a first portion of an exhaust system;
    an outlet tube disposed at a second end of the middle tube portion that is configured to connect to a second portion of the exhaust system;
    a mixer disposed at a second end of the middle tube portion adjacent to the outlet tube that is configured to decompose the urea introduced into the reactor via the injector mount;
    a metallic skirt with a hydrolysis catalyst coating applied to a portion of the skirt and attached to an inner surface of the injector mount using a post adjacent to an injector port of the injector mount, the skirt having an opening at a back end of the skirt in the injector mount, the opening configured to force the injected urea into the middle tube portion and the skirt configured to prevent the injected urea from traveling back into the injector port;
    wherein a portion of the inner surface of the injector mount, a portion of an inner surface of the middle tube portion, a portion of an inner surface of the outlet tube and a portion of an outer edge of the mixer have the hydrolysis catalyst coating applied thereto that is capable of decomposing urea and urea based deposits that come in contact with the hydrolysis catalyst coating and mitigates the formation of urea based deposits.

2. The reactor of claim 1, wherein the skirt extends to a back end of an injector chamber of the injector mount substantially toward a top portion of the middle tube portion.

3. The reactor of claim 1, wherein the hydrolysis catalyst coating comprises a metal oxide, zeolite or a combination of both metal oxide and zeolite.

4. The reactor of claim 3, wherein if the hydrolysis catalyst coating comprises the metal oxide or the combination of the metal oxide and the zeolite, the metal oxide is titania.

5. The reactor of claim 3, wherein if the hydrolysis catalyst coating comprises the metal oxide or the combination of the metal oxide and the zeolite, the metal oxide is aluminum-oxide or cerium-oxide.

6. The reactor of claim 1, wherein the hydrolysis catalyst coating is applied to the inner surface of the injector mount, the inner surface of the middle tube portion, the inner surface of the outlet tube and the outer edge of the mixer using a plasma spray or a paint spray.

7. An injector mount capable of decomposing urea and urea based deposits and mitigating the formation of urea based deposits for a reductant decomposition reactor, the injector mount comprising:
    an injector housing;
    an injector port for injecting urea into the injector mount at a first end of the injector housing;
    an injector chamber defined by the injector housing that allows passage of urea injected via the injector port to enter into the reductant decomposition reactor;
    wherein a hydrolysis catalyst coating is applied to a portion of an inner surface of the injector housing, the hydrolysis catalyst coating provided for decomposing urea and urea based deposits that comes in contact with the hydrolysis catalyst coating and for mitigating the formation of urea based deposits;
    a metallic skirt provided for preventing the injected urea from traveling back into the injector port, the skirt being attached to an inner surface of the injector housing by a post near the injector port, and the skirt having an opening at a back end of the skirt in the injector mount, wherein the hydrolysis catalyst coating is applied to a portion of an inner surface of the skirt for decomposing urea and urea based deposits that comes in contact with the hydrolysis catalyst coating and for mitigating the formation of urea based deposits.

8. The injector mount of claim 7, wherein the skirt extends into the injector chamber of the injector mount and configured to be substantially toward a top portion of a middle tube portion of the reactor.

9. The reactor of claim 1, wherein the skirt extends to a front end of an injector chamber of the injector mount.

10. The reactor of claim 1, wherein the opening at the back end of the skirt is larger than a second opening at a front end of the skirt near the injector port.

11. The injector mount of claim 7, wherein the opening at the back end of the skirt is larger than a second opening at a front end of the skirt near the injector port.

12. The reactor of claim 1, wherein the mixer has a plurality of blades extending in a direction towards the second end of the middle tube portion.

13. The reactor of claim 1, wherein the hydrolysis catalyst coating is applied to a portion of an outer surface of the skirt.

14. The injector mount of claim 7, wherein the hydrolysis catalyst coating is applied to a portion of an outer surface of the skirt.

15. The injector mount of claim 7, wherein the skirt extends to a front end of the injector chamber.

16. The injector mount of claim 7, wherein the skirt extends to a back end of the injector chamber substantially toward a top portion of the middle tube portion.

* * * * *